United States Patent
Kato et al.

(10) Patent No.: US 7,465,762 B2
(45) Date of Patent: Dec. 16, 2008

(54) POLYOLEFIN COMPOSITE MATERIAL, METHOD FOR PRODUCING SAME, AND FORMED PRODUCT THEREOF

(75) Inventors: Makoto Kato, Chita (JP); Mitsumasa Matsushita, Nagoya (JP); Kenzo Fukumori, Nisshin (JP); Keisuke Ohnishi, Toyota (JP); Takayuki Nagai, Toyota (JP)

(73) Assignees: Kabushiki Kaisha Toyota Chuo Kenkyusho, Aichi-gun (JP); Toyota Jidosha Kabushiki Kaisha, Toyota-shi (JP)

( * ) Notice: Subject to any disclaimer, the term of this patent is extended or adjusted under 35 U.S.C. 154(b) by 228 days.

(21) Appl. No.: 11/090,078

(22) Filed: Mar. 28, 2005

(65) Prior Publication Data
US 2005/0222316 A1    Oct. 6, 2005

(30) Foreign Application Priority Data
Mar. 26, 2004 (JP) ............................ 2004-091026
Mar. 23, 2005 (JP) ............................ 2005-084960

(51) Int. Cl.
*C08K 3/34* (2006.01)
(52) U.S. Cl. .................................................. 524/445
(58) Field of Classification Search .................. 524/445
See application file for complete search history.

(56) References Cited

U.S. PATENT DOCUMENTS

| | | | |
|---|---|---|---|
| 3,549,309 A | 12/1970 | Ring et al. | |
| 5,936,023 A | 8/1999 | Kato et al. | |
| 5,973,053 A | 10/1999 | Usuki et al. | |
| 6,103,817 A | 8/2000 | Usuki et al. | |
| 6,121,361 A | 9/2000 | Usuki et al. | |
| 6,384,121 B1 * | 5/2002 | Barbee et al. | 524/445 |
| 6,472,460 B1 | 10/2002 | Okamoto et al. | |
| 6,821,464 B2 * | 11/2004 | Okamoto et al. | 264/45.3 |
| 2002/0123575 A1 | 9/2002 | Kato et al. | |

FOREIGN PATENT DOCUMENTS

| | | | |
|---|---|---|---|
| JP | 08-333114 | | 12/1996 |
| JP | 09-012769 | | 1/1997 |
| JP | 10-182892 | * | 7/1998 |
| WO | WO 2005/044904 | | 5/2005 |

OTHER PUBLICATIONS

Z.M. Wang, et al., "Exfoliated PP/Clay Nanocomposites Using Ammonium-Terminated PP as the Organic Modification for Montmorillonite", Macromolecules, vol. 36, No. 24, 2003, pp. 8919-8922.

Makoto Kato, et al., "Synthesis of Polypropylene Oligomer-Clay Intercalation Compounds", Journal of Applied Polymer Science, vol. 66, pp. 1781-1785, 1997.

Noaki Hasegawa, et al., "Polyolefin-Clay Hybrids Based on Modified Polyolefins and Organophilic Clay", Macromol. Mater, Eng. 2000, 280/281, pp. 76-79.

M. Kato, et al., "Preparation and Properties of Polyethylene-Clay Hybrids", Polymer engineering and Science, Jun. 2003, vol. 43, No. 6, pp. 1312-1316.

Makoto, Kato, et al., "Development of a New Production Method for a Polypropylene-Clay Nanocomposite", Polymer Engineering and Science, Jul. 2004, vol. 44, No. 7, pp. 1205-1211.

Masaya Kawasumi, et al., "Preparation and Mechanical Properties of Polypropylene-Clay Hybrids", Macromolecules 1997, 30, pp. 6333-6338.

Naoki Hasegawa, et al., "Preparation and Mechanical Properties of Polypropylene-Clay Hybrids Using a Maleic Anhydride-Modified Polypropylene Oligomer", Journal of Applied Polymer Science, vol. 67 pp. 87-92, 1998.

Naoki Hasegawa, et al., "Preparation and Mechanical Properties of Properties of Polypropylene-Clay Hybrids Based on Modified Polypropylene and Organophilic Clay", Journal of Applied Polymer Science, vol. 78, pp. 1918-1922, 2000.

* cited by examiner

*Primary Examiner*—Robert D. Harlan
(74) *Attorney, Agent, or Firm*—Oblon, Spivak, McClelland, Maier & Neustadt, P.C.

(57) ABSTRACT

A polyolefin composite material comprising a polyolefin-based resin, an onium-modified low molecular weight polyolefin-based resin containing an organic onium group as a functional group and having a number average molecular weight of 500 to 30,000, and a layered clay mineral.

15 Claims, 4 Drawing Sheets

100nm

200nm

100nm

POLYOLEFIN COMPOSITE MATERIAL, METHOD FOR PRODUCING SAME, AND FORMED PRODUCT THEREOF

BACKGROUND OF THE INVENTION

1. Field of the Invention

This invention relates to a polyolefin composite material containing a polyolefin-based resin and a layered clay mineral, a method for producing the polyolefin composite material, and a formed product obtained by melt forming the polyolefin composite material.

2. Related Background Art

With the aim of improving the mechanical properties of polyolefin-based resins such as polypropylene, attempts have been made to incorporate a layered clay mineral, as a filler, into these resins. Japanese Patent Application Laid-Open No. 1998-182892 (Document 1) discloses a clay composite material comprising a polyolefin-based oligomer containing a functional group, an organic layered clay mineral hydrogen-bonded to the functional group, and a polyolefin resin, intended for dispersing a layered clay mineral satisfactorily in polyolefin, the layered clay mineral and polyolefin having poor compatibility with each other. The clay composite material described in Document 1 uses the polyolefin-based oligomer containing a functional group, such as a maleic anhydride group, a hydroxyl group, a carboxyl group, an amido group, an amino group, a urethane group, an ester group, an imido group, a maleimido group, a halogen group, an ether group, a thiol group, or an epoxy group. However, this clay composite material has been minimal in the effect of improving heat distortion temperature, and has been still insufficient in terms of impact resistance.

Z. W. Wang et al., "Exfoliated PP/Clay Nanocompsites Using Ammonium-Terminated PP as the Organic Modification for Montmorillonite", Macromolecules, Vol. 36, No. 24 (2003), pp. 8919-8922 (Document 2) discloses polypropylene/clay nanocomposite materials using polypropylene having an ammonium group at the terminal. The polypropylene/clay nanocomposite materials described in Document 2 use ammonium-terminated polypropylene having a number average molecular weight of 58,900. However, these nanocomposite materials have been minimal in the effect of improving rigidity and heat distortion temperature, and have been still unsatisfactory in that impact resistance is low.

SUMMARY OF THE INVENTION

The present invention has been accomplished in light of the above-described problems with the earlier technologies. An object of the present invention is to provide a polyolefin composite material whose heat distortion temperature, impact resistance, and rigidity (flexural modulus of elasticity and tensile elongation at break) are well balanced and are all achieved at a high level, a method for producing the polyolefin composite material, and a formed product obtained by melt forming the polyolefin composite material.

To attain the above object, the inventors diligently conducted studies, and have found that an onium-modified low molecular weight polyolefin-based resin containing an organic onium group as a functional group and having a number average molecular weight of 500 to 30,000 is incorporated, as a dispersion improver, into a polyolefin composite material containing a polyolefin-based resin and a layered clay mineral, whereby all of heat distortion temperature, impact resistance and rigidity are all improved in a well balanced manner. This finding has led the inventors to accomplish the present invention.

A polyolefin composite material according to the present invention is characterized by containing a polyolefin-based resin, an onium-modified low molecular weight polyolefin-based resin containing an organic onium group as a functional group and having a number average molecular weight of 500 to 30,000, and a layered clay mineral.

A formed product according to the present invention is produced by melt forming the polyolefin composite material of the present invention.

A method for producing a polyolefin composite material according to the present invention is characterized by having ready for use a solvent containing a component selected from the group consisting of water and a proton donor, a polyolefin-based resin, an onium-modified low molecular weight polyolefin-based resin containing an organic onium group as a functional group and having a number average molecular weight of 500 to 30,000, and a layered clay mineral, and bringing these substances into contact with each other at a temperature not lower than the melting temperature of the polyolefin-based resin to obtain a polyolefin composite material.

The above-mentioned polyolefin-based resin according to the present invention preferably has a number average molecular weight of 100,000 to 3,000,000 and, more preferably, is polypropylene not modified with onium.

The above-mentioned organic onium group according to the present invention is preferably at least one group selected from the group consisting of an organic ammonium group, an organic phosphonium group, and an organic sulfonium group which has a hydrocarbon group having 15 or less carbon atoms as an organic group; and more preferably, is a group formed by binding together at least one group—selected from the group consisting of an organic ammonium group, an organic phosphonium group, and an organic sulfonium group which has a hydrocarbon group having 15 or less carbon atoms as an organic group—and at least one group selected from the group consisting of a maleimido group, an amido group, a sulfonamido group, a sulfido group, an amino group, an ester group, and a thioester group.

The above-mentioned onium-modified low molecular weight polyolefin-based resin according to the present invention is preferably at least one compound selected from the group consisting of onium-modified low molecular weight polypropylene represented by the following general formula (1):

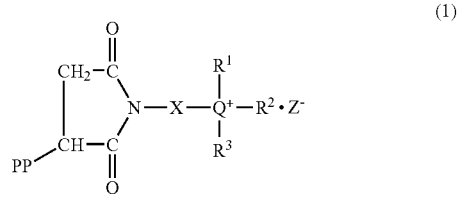

and onium-modified low molecular weight polypropylene represented by the following general formula (2):

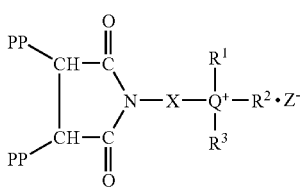

(2)

In the above general formulas (1) and (2), $R^1$ to $R^3$ may be the same or different, and each represent a group selected from the group consisting of an alkyl group, an alkenyl group, a cycloalkyl group, a cycloalkenyl group, a phenyl group, an aralkyl group, and an alkylphenyl group, each having 1 to 15 carbon atoms, X represents a group selected from the group consisting of an alkylene group, an alkylidene group, a cycloalkylene group, and a cycloalkylidene group, each having 2 to 15 carbon atoms, Q represents an atom selected from the group consisting of a nitrogen atom and a phosphorus atom, $Z^-$ represents a counter anion, and PP represents a low molecular weight polyolefin-based resin.

In the polyolefin composite material of the present invention, it is preferred that the content of the onium-modified low molecular weight polyolefin-based resin is 0.01 to 100 parts by weight, and the content of the layered clay mineral is 0.1 to 40 parts by weight, based on 100 parts by weight of the polyolefin-based resin.

The polyolefin composite material of the present invention may further contain, as a dispersing agent for the layered clay mineral, at least one substance selected from the group consisting of a compound having a functional group having affinity for a clay surface, a metal salt of sulfonic acid, a metal salt of phosphonic acid, a metal salt of carboxylic acid, an onium salt, and a water-soluble polymer.

The reason for the well-balanced improvement in all of heat distortion temperature, impact resistance and rigidity in the polyolefin composite material of the present invention is not entirely clear, but the inventors speculate as follows: The ammonium group-terminated polypropylene having a number average molecular weight of 58,900, which is described in the aforementioned Document 2, has a relatively high molecular weight, and is poorly dispersible in water. In the polypropylene composite material using it, sodium ions present between the layers of the clay and ammonium ions are not fully ion-exchanged. As a result, sufficient dispersibility of the clay has not been achieved. In the polyolefin composite material described in the aforementioned Document 1, which uses a polyolefin-based oligomer containing a functional group such as a maleic anhydride group or a hydroxyl group, the polyolefin-based oligomer and a silicate layer are bound by the affinity of a hydrogen bond, and they are dispersed in the polyolefin-based resin, as illustrated in the following reaction scheme:

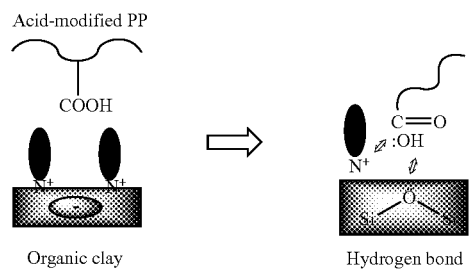

Thus, there have been limits on the improvement of heat distortion temperature and impact resistance.

On the other hand, the onium-modified low molecular weight polyolefin-based resin used in the present invention, which contains an organic onium group as a functional group and has a number average molecular weight of 500 to 30,000, is highly dispersible in water. In the polypropylene composite material using this resin, the ions present between the layers of the layered clay mineral and the ions of the organic onium group are subjected to full ion exchange. Furthermore, as illustrated in the following reaction scheme, the low molecular weight polyolefin-based resin and the layered clay mineral are firmly bound by a so-called ionic bond, and they are dispersed in the polyolefin-based resin.

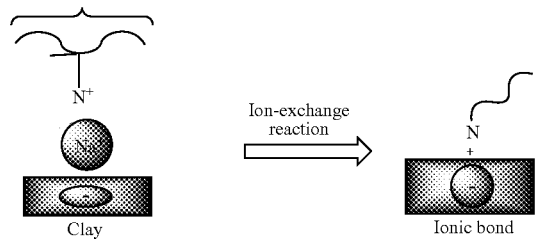

In the polyolefin composite material of the present invention, moreover, crystals of the polyolefin-based resin interact with the layered clay mineral to grow, with its surface as a starting point. This results in a tendency toward a high degree of crystallinity. The inventors speculate that the synergistic action of such factors leads to a well-balanced improvement in all of heat distortion temperature, impact resistance and rigidity in the polyolefin composite material of the present invention.

According to the polyolefin composite material of the present invention and the method for its production, all of heat distortion temperature, impact resistance and rigidity in the polyolefin composite material containing the polyolefin-based resin and the layered clay mineral can be improved to a high level in a well-balanced manner.

The use of the polyolefin composite material of the present invention, therefore, makes it possible to obtain a formed product comprising the polyolefin composite material in which all of heat distortion temperature, impact resistance and rigidity are sufficiently high in a well-balanced state.

DETAILED DESCRIPTION OF THE PREFERRED EMBODIMENTS

Figure 1:
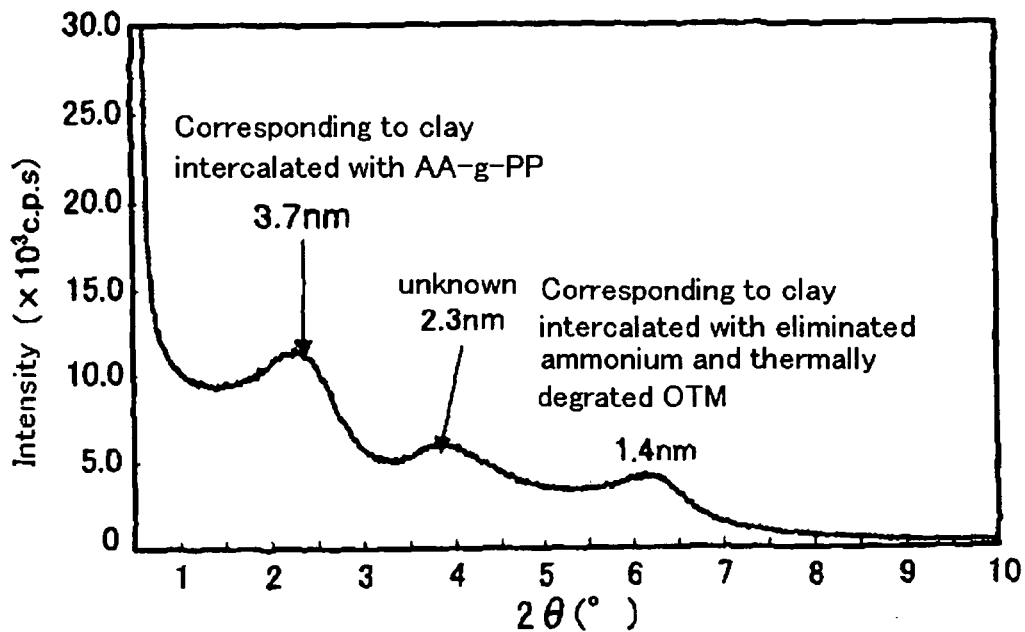
FIG. 1 is a graph showing the X-ray diffraction pattern of a polypropylene composite material obtained in Example 4.

The present invention will now be described in detail in accordance with its preferred embodiments.

The polyolefin composite material of the present invention is characterized by containing a polyolefin-based resin, an onium-modified low molecular weight polyolefin-based resin containing an organic onium group as a functional group and having a number average molecular weight of 500 to 30,000, and a layered clay mineral.

The polyolefin-based resin according to the present invention is described first. The polyolefin-based resin used in the present invention is a chain (straight chain or branched chain) high polymer consisting nearly of a combination of carbon atoms and hydrogen atoms and free from an aromatic chemical group. Examples of this resin are homopolymers of α-olefins such as polyethylene, polypropylene, polybutene, polypentene, and polyhexene; ethylene-based copolymers such as ethylene-propylene copolymer and ethylene-α-olefin copolymer; polydienes such as polybutadiene and polyisoprene; and hydrogenation products thereof. Of them, polypropylene is preferred. In the present invention, the polyolefin-based resin may be used alone, but a blend or copolymer of two or more of these polyolefin-based resins may be used. The polyolefin-based resin used as a matrix resin in the polyolefin composite material of the present invention may have a polar group at least partly, but preferably, is that which is not onium-modified as will be described later and which has no polar group.

The weight average molecular weight of the polyolefin-based resin used as the matrix resin in the present invention is preferably of the order of 100,000 to 5,000,000, and more preferably of the order of 150,000 to 1,000,000. Its number average molecular weight is preferably of the order of 100,000 to 3,000,000, and more preferably of the order of 150,000 to 1,000,000. If the molecular weight of the polyolefin-based resin is less than the above lower limit, the strength of the resulting formed product tends to be insufficient. If the upper limit is exceeded, the melt viscosity tends to be high and fabricability tends to decline.

The onium-modified low molecular weight polyolefin-based resin according to the present invention is an organic onium group-grafted polyolefin-based resin having an organic onium group as a functional group. Such an organic onium group includes, for example, an organic onium group in a narrow sense, such as an organic ammonium group ($NR_4^+ Z^-$), an organic phosphonium group ($PR_4^+ Z^-$), or an organic sulfonium group ($SR_4^+ Z^-$). The preferred organic group R for the organic onium group is a hydrocarbon group (saturated or unsaturated aliphatic hydrocarbon group, alicyclic hydrocarbon group, or aromatic hydrocarbon group) having 15 or less carbon atoms (more preferably 12 or less carbon atoms). If the number of the carbon atoms of the organic group (R) exceeds the above upper limit, difficult dispersion in water tends to occur. The organic groups (R's) in the organic onium group according to the present invention may be the same or different, or some of them may be hydrogen atoms.

Moreover, the organic onium group according to the present invention is preferably a group composed of the above-mentioned organic onium group in the narrow sense and the following group bound together, from the point of view of improving binding to the low molecular weight polyolefin-based resin: a maleimido group, an amido group, a sulfonamido group, a sulfido group, an amino group, an ester group, or a thioester group. Of these groups formed by binding, a group composed of an organic ammonium group or an organic phosphonium group, and a maleimido group bound together is particularly preferred, from the viewpoint of easy of synthesis.

Furthermore, the counter anion ($Z^-$) in the organic onium group according to the present invention is not limited, and includes, for example, an alkylsulfonate ion, a halogen ion ($Cl^-$, $Br^-$ or the like), etc.

The low molecular weight polyolefin-based resin according to the present invention is basically the same as the aforementioned polyolefin-based resin. However, the low molecular weight polyolefin-based resin is preferably such that the number average molecular weight of the onium-modified low molecular weight polyolefin-based resin formed by binding of the aforementioned organic onium group to the low molecular weight polyolefin-based resin is 500 to 30,000, more preferably 1,000 to 20,000. If the number average molecular weight of the onium-modified low molecular weight polyolefin-based resin according to the present invention is less than 500, impact resistance and heat resistance tend to decrease. If it exceeds 30,000, on the other hand, dispersibility in water deteriorates. The weight average molecular weight of the resin is preferably 1,500 to 200,000, more preferably 7,000 to 100,000.

The binding site of the organic onium group in the onium-modified low molecular weight polyolefin-based resin may be the terminal of the low molecular weight polyolefin-based resin, or may be halfway through its molecular chain. The use of the onium-modified low molecular weight polyolefin-based resin, which has the same recurring units as those of the polyolefin-based resin used as the matrix resin, is preferred from the point of view of compatibility with each other. For example, if polypropylene is used as the matrix polyolefin-based resin, it is preferred to use onium-modified low molecular weight polypropylene as the onium-modified polyolefin-based resin.

If the above descriptions are considered globally, onium-modified low molecular weight polypropylene represented by the following general formula (1):

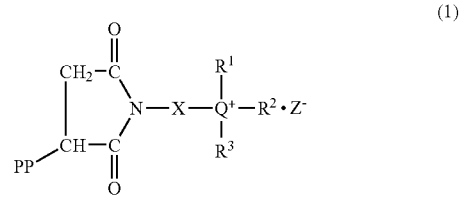

or the following general formula (2):

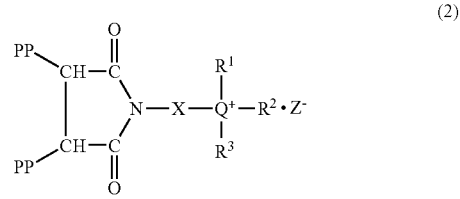

is preferred as the onium-modified low molecular weight polyolefin-based resin according to the present invention. In the above general formulas (1) and (2), $R^1$ to $R^3$ may be the same or different, and each represent a group selected from the group consisting of an alkyl group, an alkenyl group, a cycloalkyl group, a cycloalkenyl group, a phenyl group, an aralkyl group, and an alkylphenyl group, each having 1 to 15 carbon atoms, X represents a group selected from the group consisting of an alkylene group, an alkylidene group, a cycloalkylene group, and a cycloalkylidene group, each having 2 to 15 carbon atoms, Q represents a nitrogen atom or a phosphorus atom, $Z^-$ represents a counter anion, and PP represents a low molecular weight polyolefin-based resin.

In the polyolefin composite material of the present invention, the content of the onium-modified low molecular weight polyolefin-based resin is preferably 0.01 to 100 parts by weight, more preferably 0.1 to 60 parts by weight, based on 100 parts by weight of the polyolefin-based resin. If the content of the onium-modified low molecular weight polyolefin-based resin is less than the above lower limit, the heat distortion temperature, impact resistance and rigidity of the resulting polyolefin composite material tend to improve insufficiently. If the above upper limit is exceeded, on the other hand, the onium-modified low molecular weight polyolefin-based resin crosslinks, resulting in a tendency toward decreased flowability of the polyolefin composite material when melt-kneaded.

Next, the layered clay mineral incorporated into the polyolefin composite material of the present invention will be described. The layered clay mineral according to the present invention is not limited, but its examples include various clays, for example, a smectite group such as montmorillonite, beidellite, saponite, and hectorite; a kaolinite group such as kaolinite and halloysite; a vermiculite group such as dioctahedral vermiculite and trioctahedral vermiculite; and mica such as muscovite, illite, sericite, phlogopite, or biotite. These layered clay minerals may be naturally occurring minerals, or synthetic minerals produced by hydrothermal synthesis, the melting method, the solid state method, etc. In the present invention, one of the above-mentioned layered clay minerals may be used singly, or two or more of them may be used in combination. The cation exchange capacity of the layered clay mineral is preferably 30 to 300 meq/100 g.

In the polyolefin composite material of the present invention, the content of the layered clay mineral is preferably 0.1 to 40 parts by weight, more preferably 0.5 to 20 parts by weight, based on 100 parts by weight of the aforementioned polyolefin-based resin. If the content of the layered clay mineral is less than the above lower limit, the rigidity of the resulting polyolefin composite material tends to be insufficient. If it exceeds the upper limit, the resulting polyolefin composite material tends to embrittle, lowering impact strength.

In the polyolefin composite material of the present invention, in addition to the above-described components, at least one substance selected from the group consisting of the following (i) to (iv):
(i) a compound having a functional group having affinity for a clay surface;
(ii) a metal salt of sulfonic acid, a metal salt of phosphonic acid, and a metal salt of carboxylic acid;
(iii) an onium salt; and
(iv) a water-soluble polymer may be further incorporated as a dispersing agent for the layered clay mineral.

As the functional group of the compound according to the dispersing agent (i), there can be named, for example, a functional group such as an acid anhydride group, a carboxylic acid group, a hydroxyl group, a thiol group, an epoxy group, a halogen group, an ester group, an amido group, a urea group, a urethane group, an ether group, a thioether group, a sulfonic acid group, a phosphonic acid group, a nitro group, an amino group, an oxazoline group, an imido group, a cyano group, an isocyanato group, or a cyano group. An aromatic ring, such as a benzene ring, a pyridine ring, a pyrrole ring, a furan ring, or a thiophene ring, may also be named.

Examples of the dispersing agent (ii) are alkylsulfonates such as sodium dodecylsulfonate, alkylarylsulfonates such as sodium alkylbenzenesulfonates, arylsulfonates such as sodium benzenesulfonate, alkylphosphonates such as sodium dodecylphophonate, alkylarylphosphonates such as sodium alkylbenzenephosphonates, and arylphosphonates such as sodium benzenephosphonate. The metal in the metal salt is preferably sodium, potassium, calcium, magnesium or aluminum.

Examples of the onium salt according to the dispersing agent (iii) are ammonium salts, such as octylammonium chloride, octylammonium bromide, dodecylammonium chloride, dodecylammonium bromide, octadecylammonium chloride, octadecylammonium bromide, and aminododecanoate, and phosphonium salts.

Examples of the dispersing agent (iv) are polyoxyalkylene ethers such as polyethylene glycol and polypropylene glycol, polyoxyaryl ethers such as polyoxyethylenephenol ether, polyvinylalcohol, cellulose derivatives such as methyl cellulose, ethyl cellulose, hydroxyethyl cellulose, hydroxypropyl cellulose, and carboxymethyl cellulose, lignin derivatives such as lignin sulfonate, and chitosan derivative such as chitosan hydrochloride. Also, polyvinyl sulfonic acid, polyvinyl benzylsulfonic acid, polyvinyl phosphonic acid, polyvinyl benzylphosphonic acid, and polyacrylic acid are named.

The amount of such a dispersing agent added is preferably 1 to 5,000 parts by weight, more preferably 10 to 1,000 parts by weight, based on 100 parts by weight of the layered clay mineral. The incorporation of the dispersing agent in this manner tends to improve the uniform dispersibility and heat stability of the layered clay mineral further. If the amount of the dispersing agent added is less than 1 part by weight, the dispersing agent is not distributed throughout the layered clay mineral, and there is a tendency toward an insufficient effect. If the amount of the dispersing agent added exceeds 5,000 parts by weight, on the other hand, the dispersing agent tends to precipitate on the surface of the composite material without being adsorbed and bound to the surface of the layered clay mineral.

In the polyolefin composite material of the present invention, moreover, additives, such as softening agents, plasticizers, pigments, stabilizers, antistatic agents, ultraviolet absorbers, antioxidants, flame retardants, foaming agents, nucleating agents, mold release agents, lubricants, dyes, antibacterial agents, and terminal sealing agents, maybe further added, as long as they do not impair the properties of the composite material. The content of such an additive is preferably 10% by weight or less in the polyolefin composite material of the present invention. A filler, a resin other than the polyolefin-based resin and/or an elastomer may be further added, unless such an additive impairs the properties of the polyolefin composite material of the present invention. The content of this additive is preferably 40% by weight or less.

Next, the method of producing the polyolefin composite material of the present invention will be described. The method for producing the polyolefin composite material according to the present invention is characterized by having ready for use a solvent containing water or a proton donor, the polyolefin-based resin, the onium-modified low molecular weight polyolefin-based resin containing an organic onium group as a functional group and having a number average molecular weight of 500 to 30,000, and the layered clay mineral, and bringing these substances into contact with each other at a temperature not lower than the melting temperature of the polyolefin-based resin. By so doing, the aforementioned polyolefin composite material of the present invention, which achieves all of heat distortion temperature, impact resistance and rigidity at a high level in a well-balanced manner, can be obtained with high efficiency and reliability.

The solvent used here, which contains water or a proton donor, is not limited, but its examples are water, methanol, ethanol, propanol, diethyleneglycol, ethyleneglycol, propylene glycol, ethylene glycol monoethyl ether, ethylene glycol diethyl ether, ethylene glycol monoacetylate, ethylene glycol diacetylate, polyethylene glycol, and polypropylene glycol. The solvent containing water or a proton donor may contain a solvent other than water or a proton donor.

The amount of the solvent added, which contains water or a proton donor, is preferably 0.01 to 1,000 parts by weight, more preferably 0.1 to 500 parts by weight, and particularly preferably 1 to 200 parts by weight, based on 1 part by weight of the layered clay mineral. By adding the solvent containing water or a proton donor in this manner, the layered clay mineral tends to be uniformly dispersible in the polyolefin-based resin more reliably. The water or solvent added evaporates while the polyolefin-based resin is becoming cool. Thus, water or solvent can be made not to remain in the resulting polyolefin composite material. If the amount the solvent added, which contains water or a proton donor, is less than 0.01 part by weight, the layered clay mineral is insufficient in the degree of swelling, and its uniform dispersion in the polyolefin-based resin tends to be minimal. If the amount of the solvent added is in excess of 1,000 parts by weight, on the other hand, water or solvent tends to remain, with ease, in the resulting polyolefin composite material.

There is no particular limitation on the concrete method, according to the present invention, for producing the polyolefin composite material by bringing the above components into contact at a temperature not lower than the melting temperature of the polyolefin-based resin used. An example of the method is kneading with the use of a kneader, a roller, or a twin screw extruder. The method using a twin screw extruder is preferably adopted as a method by which the layered clay mineral is swollen in water or solvent, and ions between its layers are ion-exchanged with the aforementioned organic onium ions with good efficiency.

The procedure for bringing the above-described components into contact (melt-kneading them) is not limited. The following procedure is preferably employed:
(i) Melt-kneading the polyolefin-based resin, the onium-modified low molecular weight polyolefin-based resin, the layered clay mineral, and water or the solvent at the same time, and then removing the water or solvent to obtain the polyolefin composite material;
(ii) First melt-kneading the polyolefin-based resin and the onium-modified low molecular weight polyolefin-based resin, then adding the layered clay mineral, and water or the solvent to the resulting kneading product, further melt-kneading the mixture, and then removing the water or solvent to obtain the polyolefin composite material;
(iii) First melt-kneading the polyolefin-based resin, then adding the onium-modified low molecular weight polyolefin-based resin, the layered clay mineral, and water or the solvent to the resulting kneading product, further melt-kneading the mixture, and then removing the water or solvent to obtain the polyolefin composite material;
(iv) First mixing the onium-modified low molecular weight polyolefin-based resin and the layered clay mineral in a dry state, then adding the resulting mixture, water or the solvent to the polyolefin-based resin, melt-kneading the mixture, and then removing the water or solvent to obtain the polyolefin composite material; or
(v) First mixing the onium-modified low molecular weight polyolefin-based resin, the layered clay mineral, and water or the solvent, then adding the resulting mixture to the polyolefin-based resin, followed by melt-kneading, and then removing the water or solvent to obtain the polyolefin composite material.

The temperature in the kneading step is selected, as appropriate, from within a temperature range in which the resins used depending on the types of the polyolefin-based resin and the onium-modified low molecular weight polyolefin-based resin used are melted, but are not thermally decomposed. Generally, the preferred temperature is of the order of 180 to 350° C.

The above-described kneading step is preferably performed in accordance with the method disclosed in International Publication WO99/50340 by the present applicant. That is, a twin screw kneader equipped with screws capable of applying a high resin reduced pressure, a high total shearing force amount, a high shearing energy is used, and the aforementioned components are melt-kneaded under the following conditions: resin reduced pressure of $5 \times 10^4$ Pa or more (average value) or $1 \times 10^5$ Pa (maximum value), total shearing force amount of $10^5$ to $10^7$, and total shearing energy of $10^{10}$ to $10^{14}$ Pa. By this method, the dispersion uniformity of these components tends to be enhanced.

Next, the formed product of the present invention will be described. The formed product of the present invention is produced by melt-forming the aforementioned polyolefin composite material containing the polyolefin-based resin, the onium-modified low molecular weight polyolefin-based resin containing an organic onium group as a functional group and having a number average molecular weight of 500 to 30,000, and the layered clay mineral.

In producing the formed product of the present invention, the temperature used when melting the polyolefin composite material is selected, as appropriate, from within a temperature range in which the resins used depending on the types of the polyolefin-based resin and the onium-modified low molecular weight polyolefin-based resin used are melted, but are not thermally decomposed. Preferably, the temperature is of the order of 180 to 350° C. If this temperature is lower than the above lower limit, melting of the polyolefin composite material is insufficient, thus causing a tendency toward difficult forming. If this temperature exceeds the upper limit, on the other hand, the molecular weight of polyolefin tends to decrease, or polyolefin tends to be gelled, thereby impairing the physical properties of the resulting formed product. In producing the formed product of the present invention in this manner, the concrete forming method is not limited, but may be any method, such as injection molding, extrusion, blowing, inflation, profile extrusion, press molding, calendering, injection blow molding, vacuum pressure forming, or spinning. The formed product of the present invention is not limited in shape, thickness, etc., and may be in any form, such as an injection molded product, an extrudate, a compression molded product, a blow molded product, a sheet, a film, a thread, or a fabric.

EXAMPLES

The present invention will be described more specifically based on the following Examples and Comparative Examples, but the present invention is not limited to these examples:

Examples 1 to 4

Using a polyolefin-based resin, an onium-modified low molecular weight polyolefin-based resin, a layered clay mineral, and a dispersing agent to be shown below, a polyolefin composite material having each of compositions as shown in Table 1 was produced by means of a twin screw extruder (TEX30 77BW-20V, a product of The Japan Steel Works, screw diameter=32 mm, L(screw length)/D(screw diameter)=70, intermeshing corotating type) having two screws. The components were melt-kneaded under the following conditions: screw rotational speed 300 rpm, resin feed rate 9 kg/hr, set cylinder temperature 180° C., and resin temperature 185-220° C.

<Polyolefin-Based Resin>

Polypropylene resin (a product of Japan Polychem Corporation, commercial name: NOVATEC-PP Grade MA2, homopolymer, injection molding grade, hereinafter referred to as "PP").

<Modified Polyolefin-Based resin: Dispersion Improver>

Alkylammonium group-grafted polypropylene (number average molecular weight: 4,000, "AA-g-PP") represented by the following chemical formula:

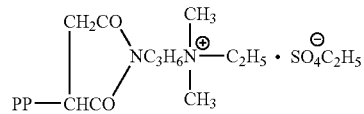

<Layered Clay Mineral>

Montmorillonite {high purity sodium type montmorillonite, a product of KUNIMINE INDUSTRIES, commercial name: Kunipia F, cation exchange capacity (C.E.C.)=110-120 (meq/100 g), "Na-Mt"}.

<Dispersing Agent>

Octadecyltrimethylammonium chloride (a product of Tokyo Kasei Kogyo, "OTM").

PP and AA-g-PP were mixed (dry blended) so as to have the composition shown in Table 1, and the mixture was charged into the twin screw extruder for melting. Then, Na-Mt, OTM and water (flow rate: 1 kg/h) were charged, at a site halfway through the twin screw extruder (at a cylinder position after melting of the resins), so as to give the composition shown in Table 1, followed by further melt-kneading. Then, water was removed to obtain a polyolefin composite material. In the presence of water in this manner, Na-Mt was swollen, and the sodium cations contained therein were ion-exchanged with the ammonium ions contained in AA-g-PP. The resulting polyolefin composite material was extruded in a strand form from the tip of the twin screw extruder, and quenched and solidified in a water bath. Then, the strand was cut by a strand cutter to obtain pellets of the polyolefin composite material (polypropylene composite material) in each of Examples 1 to 4.

The amount of Na-Mt added was set such that an inorganic content of 5 wt. % would be obtained, but the actual inorganic content determined by the ignition method was somewhere between 4 wt. % and 5 wt. %. In the case of the composition with a low amount of AA-g-PP added, the ammonium ions in AA-g-PP were not enough to be equivalent in amount to all of the sodium cations contained in Na-Mt. Thus, OTM was added so that the ammonium ions and the sodium cations would be in equivalent amounts in the system in Examples 1 to 3.

Comparative Examples 1 to 3

Pellets of a polyolefin composite material (polypropylene composite material) in each of Comparative Examples 1 to 3 were obtained in the same manner as in Examples 1 to 3, except that montmorillonite (Na-Mt) was not added.

Comparative Example 4

Maleic anhydride-modified polypropylene (YUMEX 1001, a product of SANYO CHEMICAL INDUSTRIES, "Ma-g-PP") was used as a modified polyolefin-based resin (dispersion improver), and organic montmorillonite (montmorillonite rendered organic with octadecylammonium, a product of Nanocor, "ODA-CWC") was used as a layered clay mineral.

PP and Ma-g-PP were mixed (dry blended) so as to have the composition shown in Table 1, and the mixture was charged into the twin screw extruder for melting. Then, ODA-CWC was charged, at a site halfway through the twin screw extruder (at a cylinder position after melting of the resins), so as to give the composition shown in Table 1, followed by further melt-kneading. As a result, a polyolefin composite material was obtained. The resulting polyolefin composite material was extruded in a strand form from the tip of the twin screw extruder, and quenched and solidified in a water bath. Then, the strand was cut by a strand cutter to obtain pellets of the polyolefin composite material (polypropylene composite material) in Comparative Example 4.

Comparative Example 5

Polypropylene resin (a product of Japan Polychem Corporation, commercial name: NOVATEC-PP GradeMA2, homopolymer, injection molding grade, "PP") was used as such.

Examples 5 and 6

Pellets of a polyolefin composite material (polypropylene composite material) in each of Examples 5 and 6 were obtained in the same manner as in Example 1, except that a rubber-modified polypropylene resin (a product of Japan Polychem Corporation, commercial name: NOVATEC-PP Grade BC03GSW) was used as a polypropylene resin so as to have the composition shown in Table 3.

Comparative Examples 6 and 7

Pellets of a polyolefin composite material (polypropylene composite material) in each of Comparative Examples 6 and 7 were obtained in the same manner as in Comparative Example 4, except that a rubber-modified polypropylene resin (a product of Japan Polychem Corporation, commercial name: NOVATEC-PP Grade BC03GSW) was used as a polypropylene resin so as to have the composition shown in Table 3.

Comparative Example 8

Pellets of a polyolefin composite material (polypropylene composite material) in Comparative Example 8 were obtained in the same manner as in Example 5, except that a maleic anhydride-modified polypropylene (a product of SANYO CHEMICAL INDUSTRIES, commercial name: YUMEX 1001) and OTM were not used.

Comparative Example 9

A rubber-modified polypropylene resin (a product of Japan Polychem Corporation, commercial name: NOVATEC-PP Grade BC03GSW) was used as such.

Examples 7 and 8

Pellets of a polyolefin composite material (polypropylene composite material) in each of Examples 7 and 8 were obtained in the same manner as in Example 1, except that a rubber-modified polypropylene resin (a product of Japan polychem Corporation, commercial name: NOVATEC-PP Grade MA2) as a polypropylene resin and an ethylene-octene copolymer rubber (a product of Japan Polychem Corporation, EOR) as an impact resistance improver were used so as to have the composition shown in Table 4.

Comparative Examples 10 and 11

Pellets of a polyolefin composite material (polypropylene composite material) in each of Comparative Examples 10 and 11 were obtained in the same manner as in Comparative Example 4, except that a rubber-modified polypropylene resin (a product of Japan poly chem Corporation, commercial name: NOVATEC-PP Grade MA2) as a polypropylene resin and an ethylene-octene copolymer rubber (a product of Japan Polychem Corporation, EOR) as an impact resistance improver were used so as to have the composition shown in Table 4.

Comparative Examples 12

Pellets of a polyolefin composite material (polypropylene composite material) in Comparative Example 12 were obtained in the same manner as in Example 7, except that a maleic anhydride-modified polypropylene ((a product of SANYO CHEMICAL INDUSTRIES, commercial name: YUMEX 1001) and OTM were not used.

Comparative Example 13

A mixture of a rubber-modified polypropylene resin (a product of Japan polychem Corporation, commercial name: NOVATEC-PP Grade MA2) as a polypropylene resin and an ethylene-octene copolymer rubber (a product of Japan Polychem Corporation, EOR) as an impact resistance improver was used as such, so as to have the composition shown in Table 4.

Evaluation of Physical Properties

The polypropylene composite materials obtained in Examples 1 to 8 and Comparative Examples 1 to 4, 6 to 8 and 10 to 13, and the polypropylene of Comparative Examples 5 and 9 were injection molded by an injection molding machine (PS40E2ASE, a product of NISSEI PLASTIC INDUSTRIAL) under the following conditions: mold temperature 50° C., cooling time 30 seconds, and set cylinder temperature 190° C. As a result, test pieces to be subjected to tests (to be described below) were prepared. For a melt flow rate test, the pellets were used unchanged. The following tests were conducted in connection with the polypropylene composite materials obtained in Examples 1 to 8 and Comparative Examples 1 to 4, 6 to 8 and 10 to 13, and the polypropylene of Comparative Example 5 and 9, and the results obtained are shown in Tables 2, 5 and 6.

<Tensile Property Test>

In compliance with the testing method provided for in ISO 547-1,2, a tensile test was conducted to determine the yield stress and elongation at breakage.

<Flexural Property Test>

In compliance with the testing method provided for in ISO178:1993, a flexural test was conducted to measure the flexural modulus and maximum stress. The distance between the supports was set at 64 mm.

<Heat Distortion Temperature Test>

In compliance with the testing method provided for in ISO75-2:1993, a test for heat distortion under load was conducted to measure the heat distortion temperature. The load was imposed at 0.45 MPa under flatwise conditions.

<Impact Property Test: Charpy Impact Test>

In compliance with the testing method provided for in ISO 179:1993, the impact strength (Charpy impact value) was measured. The temperature condition was 23° C.

<Melt Flow Rate Test>

In compliance with the testing method provided for in ISO 1133:1997, a melt flow test was conducted to measure the melt flow rate (MFR). The measurement was made under the following conditions: 230° C., 21.18N, preheating: 4 seconds.

TABLE 1

| | PP (MA2) | Dispersion improver | | Layered clay mineral | | OTM | Inorganic |
| | Parts by weight | Type | Parts by weight | Type | Parts by weight | Parts by weight | content (wt. %) |
|---|---|---|---|---|---|---|---|
| Ex. 1 | 72 | AA-g-PP | 28 | Na-Mt (Kunipia F) | 5 | 0 | 4.3 |
| Ex. 2 | 86 | AA-g-PP | 14 | Na-Mt (Kunipia F) | 5 | 1 | 4.7 |
| Ex. 3 | 96.5 | AA-g-PP | 3.5 | Na-Mt (Kunipia F) | 5 | 1.75 | 4.7 |
| Ex. 4 | 96.5 | AA-g-PP | 3.5 | Na-Mt (Kunipia F) | 5 | 0 | 4.0 |

TABLE 1-continued

|  | PP (MA2) Parts by weight | Dispersion improver Type | Dispersion improver Parts by weight | Layered clay mineral Type | Layered clay mineral Parts by weight | OTM Parts by weight | Inorganic content (wt. %) |
|---|---|---|---|---|---|---|---|
| Comp. Ex. 1 | 72 | AA-g-PP | 28 | Na-Mt (Kunipia F) | 0 | 0 | — |
| Comp. Ex. 2 | 86 | AA-g-PP | 14 | Na-Mt (Kunipia F) | 0 | 1 | — |
| Comp. Ex. 3 | 96.5 | AA-g-PP | 3.5 | Na-Mt (Kunipia F) | 0 | 1.75 | — |
| Comp. Ex. 4 | 70 | Ma-g-PP | 30 | ODA-CWC | 7 | — | 4.6 |
| Comp. Ex. 5 | 100 | — | — | — | — | — | — |

TABLE 2

|  | Tensile properties Yield stress MPa | Tensile properties Elongation at breakage % | Flexural properties Flexural modulus GPa | Flexural properties Maximum stress MPa | Heat distortion temperature °C. | Charpy impact value kj/m² | MFR g/10 min |
|---|---|---|---|---|---|---|---|
| Ex. 1 | 34.7 | 4.0 | 1.85 | 49 | 93.3 | 1.7 | 12.6 |
| Ex. 2 | 36.6 | 9.1 | 2.00 | 51 | 96.9 | 2 | 14.8 |
| Ex. 3 | 36.5 | 11.8 | 1.93 | 50 | 102.6 | 2.9 | 13.9 |
| Ex. 4 | 39.1 | 11.7 | 2.19 | 55 | 106.8 | 3.5 | 13.7 |
| Comp. Ex. 1 | 32.9 | 4.4 | 1.46 | 43 | 82.9 | 1.9 | 14.4 |
| Comp. Ex. 2 | 32.8 | 12.8 | 1.35 | 41 | 82.9 | 2.5 | 29.2 |
| Comp. Ex. 3 | 31.8 | 201.1 | 1.26 | 39 | 82.2 | 3 | 21 |
| Comp. Ex. 4 | 36.6 | 2.7 | 2.30 | 51 | 92.5 | 1.2 | 40.4 |
| Comp. Ex. 5 | 35.0 | >400 | 1.54 | 46 | 92.4 | 3.4 | 15.7 |

TABLE 3

|  | PP (BC03GSW) Parts by weight | Dispersion improver Type | Dispersion improver Parts by weight | Layered clay mineral Type | Layered clay mineral Parts by weight | OTM Parts by weight | Inorganic content (wt. %) |
|---|---|---|---|---|---|---|---|
| Ex. 5 | 95 | AA-g-PP | 5 | Na-Mt | 5 | 1.65 | 4.7 |
| Ex. 6 | 90 | AA-g-PP | 10 | Na-Mt | 5 | 1.65 | 4.8 |
| Comp. Ex. 6 | 95 | Ma-g-PP | 5 | ODA-CWC | 7 | — | 4.7 |
| Comp. Ex. 7 | 90 | Ma-g-PP | 10 | ODA-CWC | 7 | — | 4.7 |
| Comp. Ex. 8 | 100 | — | — | Na-Mt | 5 | — | 4.9 |
| Comp. Ex. 9 | 100 | — | — | — | — | — | — |

TABLE 4

|  | PP (MA2) Parts by weight | EOR Parts by weight | Dispersion improver Type | Dispersion improver Parts by weight | Layered clay mineral Type | Layered clay mineral Parts by weight | OTM Parts by weight | Inorganic content (wt. %) |
|---|---|---|---|---|---|---|---|---|
| Ex. 7 | 75 | 20 | AA-g-PP | 5 | Na-Mt | 5 | 1.65 | 4.8 |
| Ex. 8 | 70 | 20 | AA-g-PP | 10 | Na-Mt | 5 | 1.65 | 4.6 |

TABLE 4-continued

| | PP (MA2) | EOR | Dispersion improver | | Layered clay mineral | | OTM | |
|---|---|---|---|---|---|---|---|---|
| | Parts by weight | Parts by weight | Type | Parts by weight | Type | Parts by weight | Parts by weight | Inorganic content (wt. %) |
| Comp. Ex. 10 | 75 | 20 | Ma-g-PP | 5 | ODA-CWC | 7 | — | 4.7 |
| Comp. Ex. 11 | 70 | 20 | Ma-g-PP | 10 | ODA-CWC | 7 | — | 4.8 |
| Comp. Ex. 12 | 80 | 20 | — | — | Na-Mt | 5 | — | 4.6 |
| Comp. Ex. 13 | 80 | 20 | — | — | — | — | — | — |

TABLE 5

| | flexural property | | | | |
|---|---|---|---|---|---|
| | flexural modulus of elasticity GPa | maximum stress MPa | heat distortion temperature °C. | Charpy impact value kJ/m² | MFR g/10 min |
| Ex. 5 | 1.77 | 43 | 100.8 | 6.3 | 26.8 |
| Ex. 6 | 1.85 | 44 | 102.5 | 4.5 | 22.1 |
| Comp. Ex. 6 | 1.34 | 35 | 92.2 | 3.6 | 29.4 |
| Comp. Ex. 7 | 1.4 | 35 | 91.4 | 3.1 | 31.3 |
| Comp. Ex. 8 | 1.22 | 32 | 91.2 | 5.1 | 32.3 |
| Comp. Ex. 9 | 1.04 | 31 | 83.4 | 6.3 | 28.8 |

TABLE 6

| | flexural property | | | | |
|---|---|---|---|---|---|
| | flexural modulus of elasticity GPa | maximum stress MPa | heat distortion temperature °C. | Charpy impact value kJ/m² | MFR g/10 min |
| Ex. 7 | 1.61 | 41 | 98.2 | 6.9 | 15.3 |
| Ex. 8 | 1.68 | 41 | 98.1 | 6.6 | 14.9 |
| Comp. Ex. 10 | 1.43 | 37 | 85.8 | 3.4 | 14.9 |
| Comp. Ex. 11 | 1.48 | 37 | 85 | 3.3 | 14.9 |
| Comp. Ex. 12 | 1.38 | 37 | 87.5 | 5.4 | 16.8 |
| Comp. Ex. 13 | 1.05 | 32 | 74.7 | 4 | 20.7 |

As clear from the results shown in Tables 1 and 2, the formed products consisting of the polyolefin composite materials of the present invention were all sufficiently high in the heat distortion temperature, impact resistance, and rigidity which were well-balanced. The formed products consisting of the polyolefin composite materials of Comparative Examples 1 to 3 free from the layered clay mineral, on the other hand, were inferior in heat distortion temperature and rigidity. The formed product consisting of the polyolefin composite material of Comparative Example 4, which used maleic anhydride-modified polypropylene and organic montmorillonite, was inferior in heat distortion temperature and impact resistance.

As clear from the results shown in Tables 5 and 6, the formed products consisting of the polyolefin composite materials of the present invention were all sufficiently high in the heat distortion temperature, impact resistance, and rigidity which were well-balanced. The formed products consisting of the polyolefin resin of Comparative Examples 9 and 13 free from the layered clay mineral, on the other hand, were inferior in flexural property and heat distortion temperature. The formed product consisting of the polyolefin composite material of Comparative Examples 6, 7, 10 and 11, which used maleic anhydride-modified polypropylene and organic montmorillonite, were inferior in flexural property, heat distortion temperature and impact resistance. Furthermore, the formed products consisting of the polyolefin composite materials which were not added an alkylammonium group-grafted polypropylene of Comparative Examples 8 and 12 were inferior in flexural property, heat distortion temperature and impact resistance.

X-ray Diffraction Measurement

Figure 2:
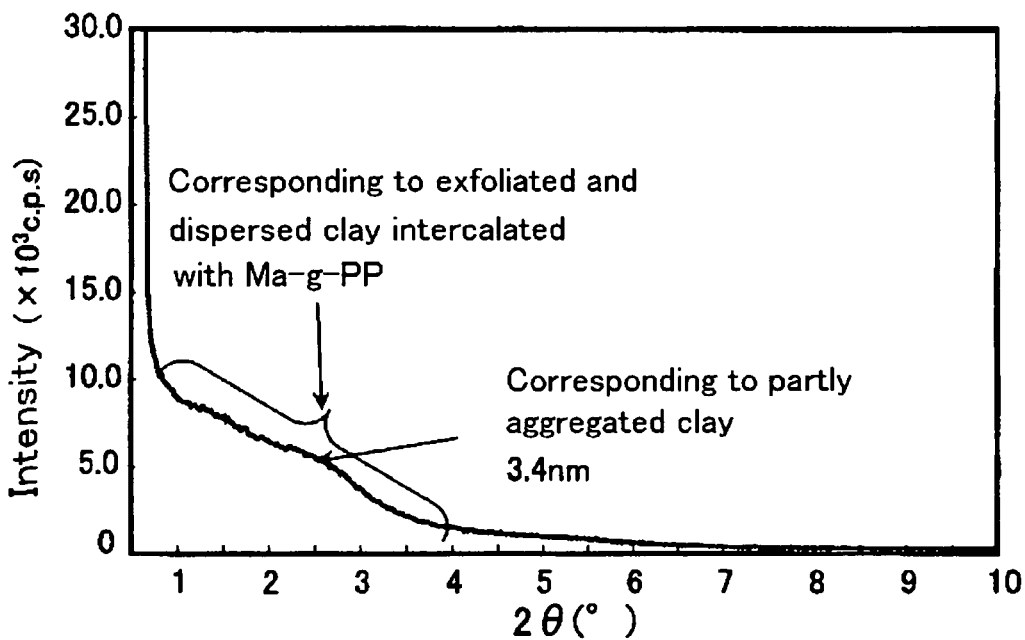
FIG. 2 is a graph showing the X-ray diffraction pattern of a polypropylene composite material obtained in Comparative Example 4.
Figure 3:
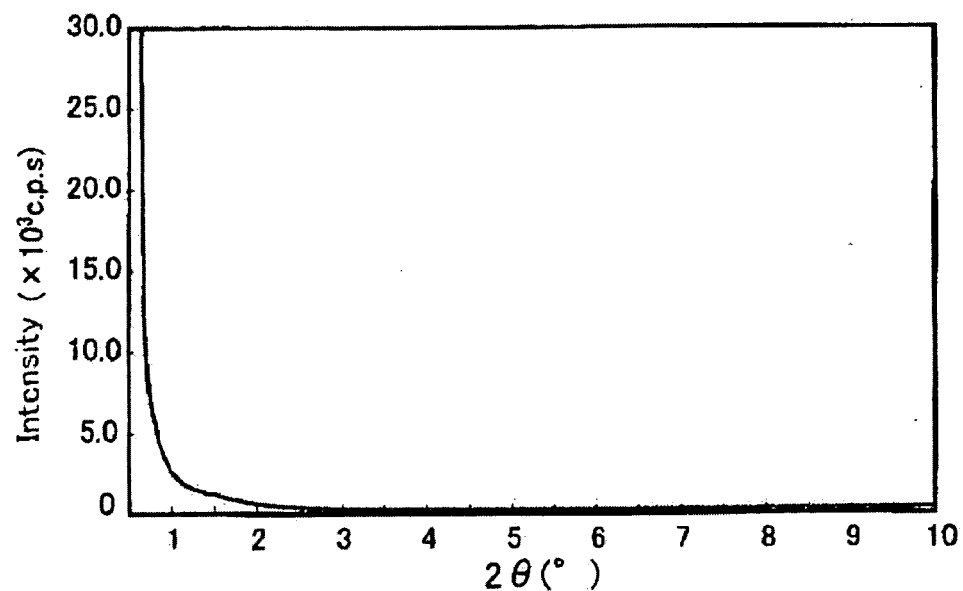
FIG. 3 is a graph showing the X-ray diffraction pattern of polypropylene used in Comparative Example 5.

The polypropylene composite materials obtained in Example 4 and Comparative Example 4 and the polypropylene of Comparative Example 5 were evaluated for the dispersed state of the layered clay mineral in the sample by X-ray diffraction measurement. That is, each of the polypropylene composite materials obtained in Example 4 and Comparative Example 4 and the polypropylene of Comparative Example 5 was hot pressed at 230° C. to prepare a film of about 0.5 mm in thickness, which was used as a sample. The resulting sample was measured for X-ray diffraction with the use of an X-ray diffraction measuring device (RINT-TTR, a product of Rigaku Denki) under the measuring conditions indicated below to find the lamellar spacing [interplanar spacing of the d(001) plane] of montmorillonite. Based thereon, its dispersed state was evaluated. The X-ray diffraction patterns obtained are shown in FIG. 1 (Example 4), FIG. 2 (Comparative Example 4), and FIG. 3 (Comparative Example 5).

<Conditions for X-Ray Diffraction Measurement>
X-ray source: Cu-Kα
Bulb voltage: 50 kV
Tube current: 300 mA
Slit width (divergence slit): 0.125 mm
Slit width (scattering slit): 0.25 mm
Slit width (receiving slit): 0.1 mm Observation on Transmission Electron Microscope (TEM)

Figure 4:
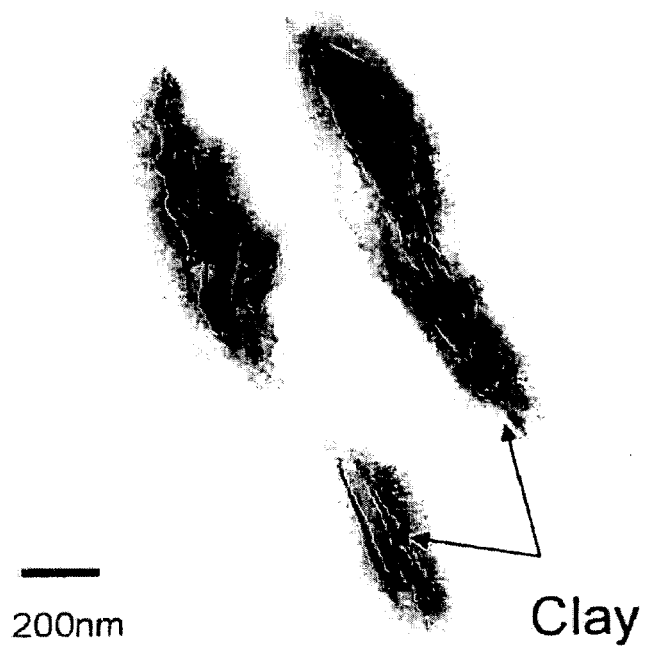
FIG. 4 is a transmission electron microscope photograph of the polypropylene composite material obtained in Example 4.
Figure 6:
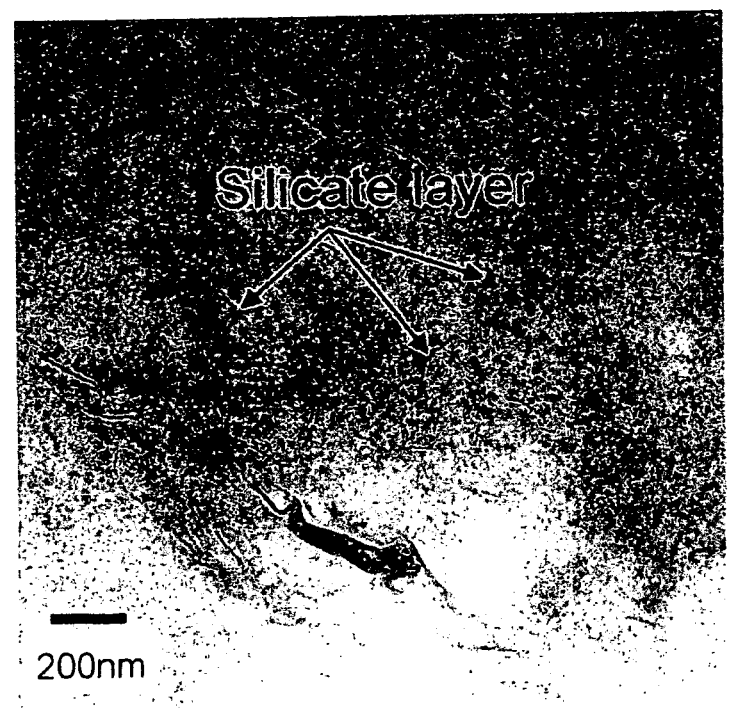
FIG. 6 is a transmission electron microscope photograph of the polypropylene composite material obtained in Comparative Example 4.
Figure 7:
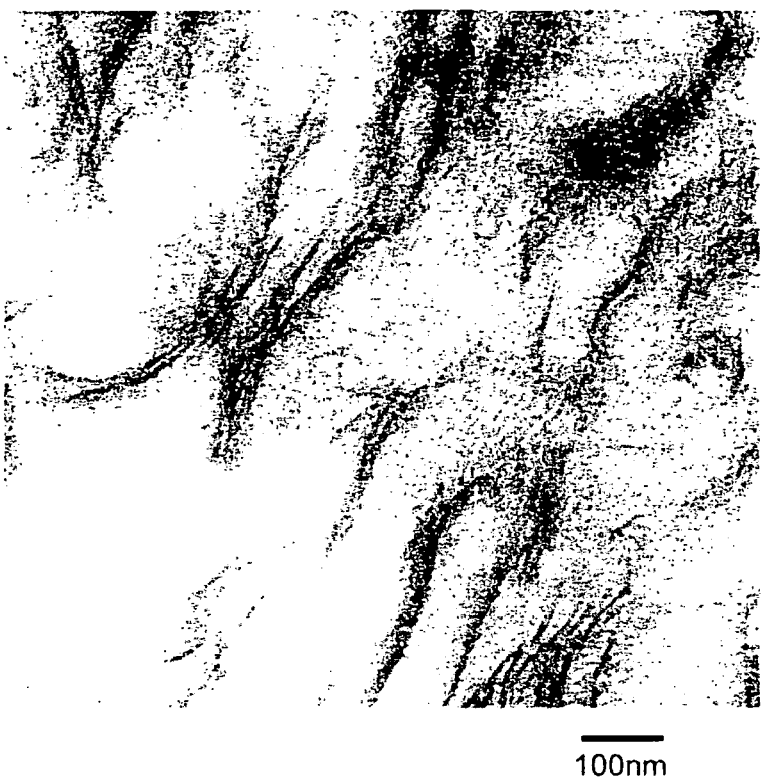
FIG. 7 is a transmission electron microscope photograph of the polypropylene composite material obtained in Comparative Example 4.

The polypropylene composite materials obtained in Example 4 and Comparative Example 4 were evaluated for the dispersed state of the layered clay mineral in the sample by transmission electron microscope observation. That is, a test piece obtained by injection molding each of the polypropylene composite materials obtained in Example 4 and Comparative Example 4 was frozen, and an ultrathin section was cut out with a microtome in a direction perpendicular to the flowing direction of the resin. The ultrathin section was used as a sample for observation. The resulting sample was subjected to transmission electron microscope observation with the use of a transmission electron microscope (JEM-2010, a product of JEOL) at an accelerating voltage of 200 kV. Transmission electron microscope photographs of the sample obtained in Example 4 are shown in FIGS. 4 and 5, and transmission electron microscope photographs of the sample obtained in Comparative Example 4 are shown in FIGS. 6 and 7.

Figure 8:
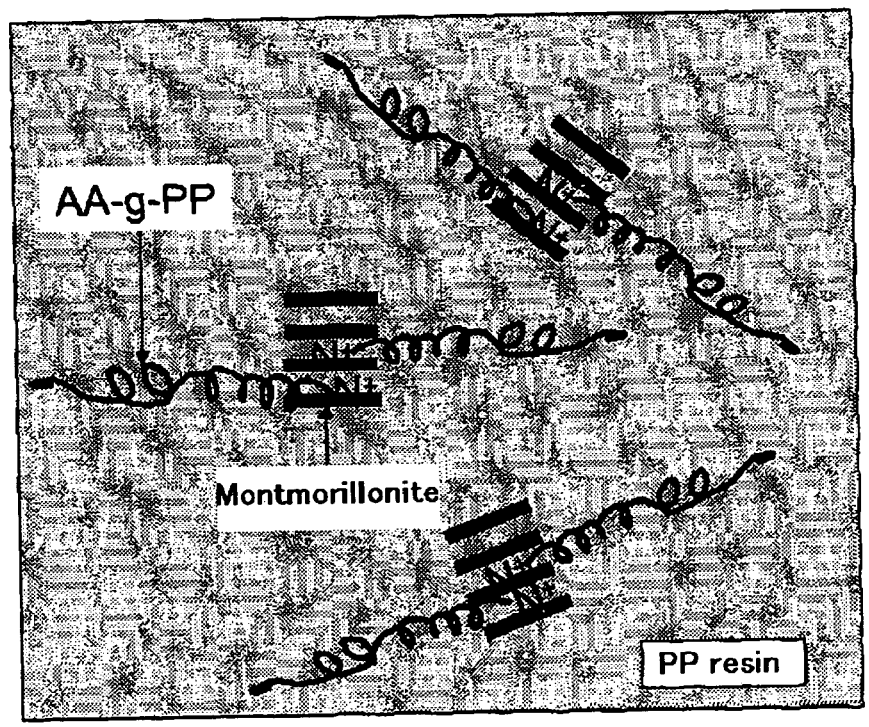
FIG. 8 is a view schematically showing the dispersed state of a layered clay mineral in the polypropylene composite material obtained in Example 4.

The results of the above-described X-ray diffraction measurement and transmission electron microscope observation confirmed the following facts: In the polyolefin composite material of the present invention, as schematically shown in FIG. 8, the onium-modified low molecular weight polyolefin-based resin was intercalated between the layers of the layered clay mineral, but the layered clay mineral was dispersed in the polyolefin-based resin in an aggregated state (a state where several tens of layers retained a layer structure) without being in an exfoliated dispersed state. In the polyolefin composite material of Comparative Example 4 using maleic anhydride-modified polypropylene and organic montmorillonite, on the other hand, the layered clay mineral was partly aggregated, but most of the layered clay mineral was intercalated with the maleic anhydride-modified polypropylene and dispersed in an exfoliated dispersed state.

Figure 5:
FIG. 5 is a transmission electron microscope photograph of the polypropylene composite material obtained in Example 4.

In the polyolefin composite material of the present invention, as clear from the transmission electron microscope photograph shown in FIG. 5, crystals of polypropylene were confirmed to grow, with the surface of the layered clay mineral as the staring point. In the polyolefin composite material of Comparative Example 4, as clear from the transmission electron microscope photograph shown in FIG. 7, crystals of polypropylene grew nearly parallel to the layers of the layered clay mineral, and were thus confirmed to exist independently of the layered clay mineral. As seen from these findings, the layered clay mineral and the crystals of polypropylene grow in interacting relationship in the polyolefin composite material of the present invention. The inventors presume this interaction to be one of the factors for improving heat distortion temperature and impact properties.

Differential Scanning Calorimetry (DSC)

In connection with the polypropylene composite materials obtained in Example 4 and Comparative Example 4, differential scanning calorimetry was performed. That is, each of the polypropylene composite materials obtained in Example 4 and Comparative Example 4 was heated at a heating rate of 10° C./min, beginning at room temperature and ending at 200° C., and was held at this temperature for 5 minutes. Then, the test material was cooled at a cooling rate of 10° C./min. The crystallization temperature and the calorific value associated with crystallization during this process were measured. The following results were obtained:

|  | Crystallization temperature (° C.) | Calorific value (J/g) |
| --- | --- | --- |
| Ex. 4 | 120.0 | +98.1 |
| Comp. Ex. 4 | 112.3 | +90.8 |

As indicated by the above results, the polyolefin composite material of the present invention was higher in the crystallization temperature and more in the calorific value than the polyolefin composite material of Comparative Example 4, and was thus confirmed to be easily crystallizable and have a higher degree of crystallinity. The inventors presume this high degree of crystallinity to be one of the factors for improving heat distortion temperature and impact properties in the polyolefin composite material of the present invention.

INDUSTRIAL APPLICABILITY

As described above, all of heat distortion temperature, impact resistance, and rigidity are achieved at a high level in a well-balanced manner in the polyolefin composite material of the present invention. The formed product composed of this polyolefin composite material has sufficiently high heat distortion temperature, impact resistance, and rigidity in a well-balanced manner. Thus, the formed product consisting of the polyolefin composite material of the present invention is useful as automobile parts, such as body parts, including bumper, radiator grille, side molding, garnish, wheel cover, aero parts, instrument panel, door trim, seat fabric, door handle, floor mat, fender, and fender cover, a housing for household electrical appliances, product packaging films, waterproof sheets, various containers, and bottles. When the formed product of the present invention is to be used as a sheet, it may be laminated on paper or other polymer sheet for use as a laminate of a multi-layer structure.

What is claimed is:

1. A polyolefin composite material comprising:
polypropylene which has not been onium-modified;
an onium-modified low molecular weight polyolefin-based resin having a number average molecular weight of 1000 to 30,000 and consisting of molecules containing an organic onium group as a functional group; and
a layered clay mineral.

2. The polyolefin composite material according to claim 1, wherein the polypropylene which has not been onium-modified has a number average molecular weight of 100,000 to 3,000,000.

3. The polyolefin composite material according to claim 1, wherein the organic onium group is at least one group selected from the group consisting of an organic ammonium group, an organic phosphonium group, and an organic sulfonium group, which has a hydrocarbon group having 15 or less carbon atoms as an organic group.

4. A polyolefin composite material comprising:
a polyolefin-based resin;
an onium-modified low molecular weight polyolefin-based resin having a number average molecular weight of 1000 to 30,000 and consisting of molecules containing an organic onium group as a functional group; and
a layered clay mineral, wherein
the organic onium group is a group formed by binding together
at least one group selected from the group consisting of an organic ammonium group, an organic phosphonium group, and an organic sulfonium group, which has a hydrocarbon group having 15 or less carbon atoms as an organic group, and
at least one group selected from the group consisting of a maleimido group, an amido group, a sulfonamido group, a sulfido group, an amino group, an ester group, and a thioester group.

5. A polyolefin composite material comprising:
a polyolefin-based resin;
an onium-modified low molecular weight polyolefin-based resin having a number average molecular weight of 1000 to 30,000 and consisting of molecules containing an ornanic onium group as a functional group; and
a layered clay mineral, wherein
the onium-modified low molecular weight polyolefin-based resin is at least one compound selected from the group consisting of onium-modified low molecular weight polypropylene represented by the following general formula (1):

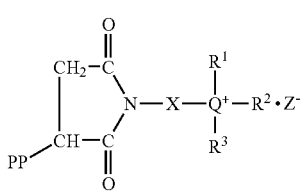

and onium-modified low molecular weight polypropylene represented by the following general formula (2):

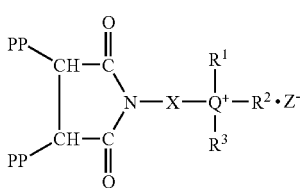

where $R^1$ to $R^3$ may be the same or different, and each represent a group selected from the group consisting of an alkyl group, an alkenyl group, a cycloalkyl group, a cycloalkenyl group, a phenyl group, an aralkyl group, and an alkyiphenyl group, each having 1 to 15 carbon atoms, X represents a group selected from the group consisting of an alkylene group, an alkylidene group, a cycloalkylene group, and a cycloalkylidene group, each having 2 to 15 carbon atoms, Q represents an atom selected from the group consisting of a nitrogen atom and a phosphorus atom, $Z^-$ represents a counter anion, and PP represents a low molecular weight polyolefin-based resin.

6. The polyolefin composite material according to claim 1, wherein a content of the onium-modified low molecular weight polyolefin-based resin is 0.01 to 100 parts by weight, and a content of the layered clay mineral is 0.1 to 40 parts by weight, based on 100 parts by weight of the polypropylene which has not been onium-modified.

7. The polyolefin composite material according to claim 1, further containing, as a dispersing agent for the layered clay mineral, at least one substance selected from the group consisting of a compound having a functional group having affinity for a clay surface, a metal salt of sulfonic acid, a metal salt of phosphonic acid, a metal salt of carboxylic acid, an onium salt, and a water-soluble polymer.

8. A method for producing a polyolefin composite material, the method comprising:
having ready for use a solvent containing a component selected from the group consisting of water and a proton donor, polypropylene which has not been onium-modified, an onium-modified low molecular weight polyolefin-based resin having a number average molecular weight of 1000 to 30,000 and consisting of molecules containing an organic onium group as a functional group, and a layered clay mineral; and
bringing the solvent, the polypropylene which has not been onium-modified, the onium-modified low molecular weight polyolefin-based resin, and the layered clay mineral into contact with each other at a temperature not lower than a melting temperature of the polypropylene which has not been onium-modified to obtain the polyolefin composite material of claim 1.

9. The method for producing a polyolefin composite material according to claim 8, wherein the polypropylene which has not been onium-modified has a number average molecular weight of 100,000 to 3,000,000.

10. The method for producing a polyolefin composite material according to claim 8, wherein the organic onium group is at least one group selected from the group consisting of an organic ammonium group, an organic phosphonium group, and an organic sulfonium group, which has a hydrocarbon group having 15 or less carbon atoms as an organic group.

11. A method for producing a polyolefin omposite material, the method comprising:
having ready for use a solvent containing a component selected from the group consisting of water and a proton donor, a polyolefin-based resin, an onium-modified low molecular weight polyolefin-based resin having a number average molecular weight of 1000 to 30,000 and consisting of molecules containing an organic onium group as a functional group, and a layered clay mineral; and
bringing the solvent, the polyolefin-based resin, the onium-modified low molecular weight polyolefin-based resin, and the layered clay mineral into contact with each other at a temperature not lower than a melting temperature of the polyolefin-based resin to obtain the polyolefin composite material of claim 4, wherein
the organic onium group is a group formed by binding together
at least one group selected from the group consisting of an organic ammonium group, an organic phosphonium group, and an organic sulfonium group, which has a hydrocarbon group having 15 or less carbon atoms as an organic group, and
at least one group selected from the group consisting of a maleimido group, an amido group, a sulfonamido group, a sulfido group, an amino group, an ester group, and a thioester group.

12. A method for producing a polyolefin composite material, the method comprising:
having ready for use a solvent containing a component selected from the group consisting of water and a proton donor, a polyolefin-based resin, an onium-modified low molecular weight polyolefin-based resin having a number average molecular weight 1000 to 30,000 and consisting of molecules containing an organic onium group as a functional group, and a layered clay mineral; and
bringing the solvent, the polyolefin-based resin, the onium-modified low molecular weight polyolefin-based resin, and the layered clay mineral into contact with each other at a temperature not lower than a melting temperature of the polyolefin-based resin to obtain the polyolefin composite material of claim 5, wherein
the onium-modified low molecular weight polyolefin-based resin is at least one compound selected from the group consisting of onium-modified low molecular weight polypropylene represented by the following general formula (1):

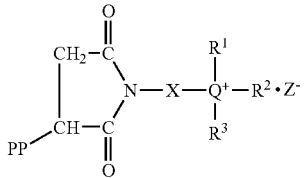
(1)

and onium-modified low molecular weight polypropylene represented by the following general formula(2):

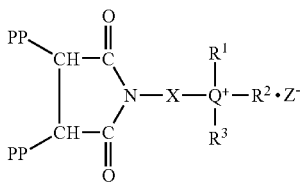
(2)

where $R^1$ to $R^3$ may be the same or different, and each represent a group selected from the group consisting of an alkyl group, an alkenyl group, a cycloalkyl group, a cycloalkenyl group, a phenyl group, an aralkyl group, and an alkylphenyl group, each having 1 to 15 carbon atoms, X represents a group selected from the group consisting of an alkylene group, an alkylidene group, a cycloalkylene group, and a cycloalkylidene group, each having 2 to 15 carbon atoms, Q represents an atom selected from the group consisting of a nitrogen atom and a phosphorus atom, $Z^-$ represents a counter anion, and PP represents a low molecular weight polyolefin-based resin.

13. The method for producing a polyolefin composite material according to claim 8, wherein a content of the onium-modified low molecular weight polyolefin-based resin is 0.01 to 100 parts by weight, and a content of the layered clay mineral is 0.1 to 40 parts by weight, based on 100 parts by weight of the polypropylene which has not been onium-modified.

14. The method for producing a polyolefin composite material according to claim 8, further incorporating, as a dispersing agent for the layered clay mineral, at least one substance selected from the group consisting of a compound having a functional group having affinity for a clay surface, a metal salt of sulfonic acid, a metal salt of phosphonic acid, a metal salt of carboxylic acid, an onium salt, and a water-soluble polymer.

15. A formed product produced by melt-forming the polyolefin composite matterrial of claim 1.

* * * * *

UNITED STATES PATENT AND TRADEMARK OFFICE
CERTIFICATE OF CORRECTION

PATENT NO. : 7,465,762 B2
APPLICATION NO. : 11/090078
DATED : December 16, 2008
INVENTOR(S) : Makoto Kato et al.

It is certified that error appears in the above-identified patent and that said Letters Patent is hereby corrected as shown below:

Column 21, line 6, "ornanic" should read --organic--

Column 21, line 40, "alkyiphenyl" should read --alkylphenyl--

Signed and Sealed this

Third Day of March, 2009

JOHN DOLL
*Acting Director of the United States Patent and Trademark Office*